United States Patent
Baban et al.

(10) Patent No.: US 8,873,554 B2
(45) Date of Patent: *Oct. 28, 2014

(54) DATA STRUCTURE-LESS DISTRIBUTED FABRIC MULTICAST

(71) Applicant: Juniper Networks, Inc., Sunnyvale, CA (US)

(72) Inventors: Alex Baban, San Jose, CA (US); Jean-Marc Frailong, Los Altos Hills, CA (US); Kireeti Kompella, Los Altos, CA (US); Nitin Kumar, Fremont, CA (US); Jamsheed Wania, Palo Alto, CA (US); Murtuza Attarwala, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/692,701

(22) Filed: Dec. 3, 2012

(65) Prior Publication Data

US 2013/0156032 A1   Jun. 20, 2013

Related U.S. Application Data

(63) Continuation of application No. 12/702,718, filed on Feb. 9, 2010, now Pat. No. 8,325,726.

(51) Int. Cl.
*H04L 12/56* (2006.01)
*H04J 3/26* (2006.01)
*H04L 12/18* (2006.01)
*H04L 12/931* (2013.01)
*H04L 12/933* (2013.01)
*H04L 12/761* (2013.01)

(52) U.S. Cl.
CPC .............. *H04L 12/18* (2013.01); *H04L 49/201* (2013.01); *H04L 49/10* (2013.01); *H04L 45/16* (2013.01)
USPC ......................................... 370/390; 370/432

(58) Field of Classification Search
CPC ....... H04L 45/16; H04L 49/201; H04L 49/10; H04L 12/18; H04L 69/22
See application file for complete search history.

(56) References Cited

U.S. PATENT DOCUMENTS

| | | | |
|---|---|---|---|
| 6,931,014 B2 | 8/2005 | Lee | |
| 7,301,945 B1 | 11/2007 | Ooms et al. | |
| 7,602,787 B2 * | 10/2009 | Cheriton | 370/392 |
| 7,808,990 B2 * | 10/2010 | Lee et al. | 370/389 |
| 7,948,877 B2 * | 5/2011 | Chen et al. | 370/229 |
| 2003/0095561 A1 | 5/2003 | Hwang | |
| 2003/0142672 A1 * | 7/2003 | Chen et al. | 370/390 |
| 2005/0094658 A1 * | 5/2005 | Chen et al. | 370/432 |
| 2008/0146213 A1 | 6/2008 | Kim et al. | |
| 2011/0194557 A1 | 8/2011 | Baban et al. | |

* cited by examiner

Primary Examiner — Hassan Phillips
Assistant Examiner — Saba Tsegaye
(74) Attorney, Agent, or Firm — Harrity & Harrity, LLP (57) ABSTRACT

A network device receives a packet with a multicast nexthop identifier, and creates a mask that includes addresses of egress packet forwarding engines, of the network device, to which to provide the packet. The network device divides the mask into two portions, generates two copies of the packet, provides a first portion of the mask in a first copy of the packet, and provides a second portion of the mask in a second copy of the packet. The network device also forwards the first copy of the packet to an address of a first egress packet forwarding engine provided in the first portion of the mask, and forwards the second copy of the packet to an address of a second egress packet forwarding engine provided in the second portion of the mask.

19 Claims, 10 Drawing Sheets

DATA STRUCTURE-LESS DISTRIBUTED FABRIC MULTICAST

RELATED APPLICATION

This application is a continuation of U.S. patent application Ser. No. 12/702,718, filed Feb. 9, 2010 (now U.S. Pat. No. 8,325,726), the disclosure of which is incorporated herein by reference.

BACKGROUND

Computing and communication networks typically include network devices, such as routers, firewalls, switches, or gateways, which transfer or switch data, such as packets, from one or more sources to one or more destinations. Network devices may operate on the packets as the packets traverse the network, such as by forwarding or filtering the packet-based network traffic.

A multicast operation requires a copy of a packet to be delivered to every line card (e.g., packet forwarding engine (PFE) of a network device) that has interfaces participating in a multicast group. When a large number of PFEs need to be reached in a multicast operation, performing all the necessary replications of the packet on an ingress PFE results in over-subscription of the ingress PFE's processing capacity and bandwidth into the fabric of the network device. Using a binary replication tree scheme, where each PFE sends no more than two copies of the packet into the fabric, can solve such problems. However, when a multicast topology changes in the binary replication tree scheme, all of the PFEs of the network device need to update their local state, which can take a long time. Furthermore, in the binary replication tree scheme, while the multicast tree is being updated in every PFE, it is difficult to guarantee that the tree remains consistent, and a copy of every packet is delivered to every participating PFE.

SUMMARY

According to one aspect, a method may be implemented by a network device. The method may include: receiving, by an ingress PFE of the network device, a packet with a multicast nexthop identifier; creating, by the ingress PFE, a mask that includes addresses of egress PFEs to which to provide the packet; dividing, by the ingress PFE, the mask into two portions; generating, by the ingress PFE, two copies of the packet; providing, by the ingress PFE, a first portion of the mask in a first copy of the packet; and forwarding, by the ingress PFE, the first copy of the packet to an address of an egress PFE provided in the first portion of the mask.

According to another aspect, a method may be implemented by a network device. The method may include: receiving, by a PFE of the network device, a packet with a mask that includes addresses of other PFEs to which to provide the packet; determining, by the PFE, that the mask is divisible; dividing, by the PFE, the mask into two portions; generating, by the PFE, two copies of the packet; providing, by the PFE, a first portion of the mask in a first copy of the packet; and forwarding, by the PFE, the first copy of the packet to an address of one of the other PFEs provided in the first portion of the mask.

According to still another aspect, a network device may include a memory to store a plurality of instructions, and a processor to execute instructions in the memory. The processor may execute instructions in the memory to: receive a packet with a multicast nexthop identifier, create a mask that includes addresses of egress PFEs, of the network device, to which to provide the packet, divide the mask into two portions, generate two copies of the packet, provide a first portion of the mask in a first copy of the packet, provide a second portion of the mask in a second copy of the packet, forward the first copy of the packet to an address of a first egress PFE provided in the first portion of the mask, and forward the second copy of the packet to an address of a second egress PFE provided in the second portion of the mask.

According to a further aspect, a network device may include a memory to store a plurality of instructions, and a processor to execute instructions in the memory. The processor may execute instructions in the memory to: receive a packet with a mask that includes addresses of PFEs to which to provide the packet, determine that the mask is divisible, divide the mask into two portions, generate two copies of the packet, provide a first portion of the mask in a first copy of the packet, provide a second portion of the mask in a second copy of the packet, forward the first copy of the packet to an address of one of the PFEs provided in the first portion of the mask, and forward the second copy of the packet to an address of another one of the PFEs provided in the second portion of the mask.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

Implementations described herein may include systems and/or methods that may provide a technique for the binary replication tree scheme that avoids a need for static tree data structures governing packet replication in each PFE. In an exemplary implementation, a mask (e.g., indicating which PFEs have yet to be reached by a multicast packet) and a multicast nexthop identifier (ID) may be provided with every copy of the packet. When a PFE creates two copies of the packet, the mask may be split substantially into two halves. One half of the mask may be provided with the first copy of the packet, and another half of the mask may be provided with the second copy of the packet. Each copy of the packet (e.g., and its corresponding mask) may be forwarded to another PFE, and the other PFE may perform similar operations. Eventually, the mask may not indicate any more PFEs yet to be reached by the packet, and packet replication may cease (e.g., since the packet may have reached all of the PFEs participating in the multicast). Such an arrangement may reduce complexity and may provide quicker adjustment to changes in a multicast topology.

The terms "component" and "device," as used herein, are intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

Exemplary Network

Figure 1:
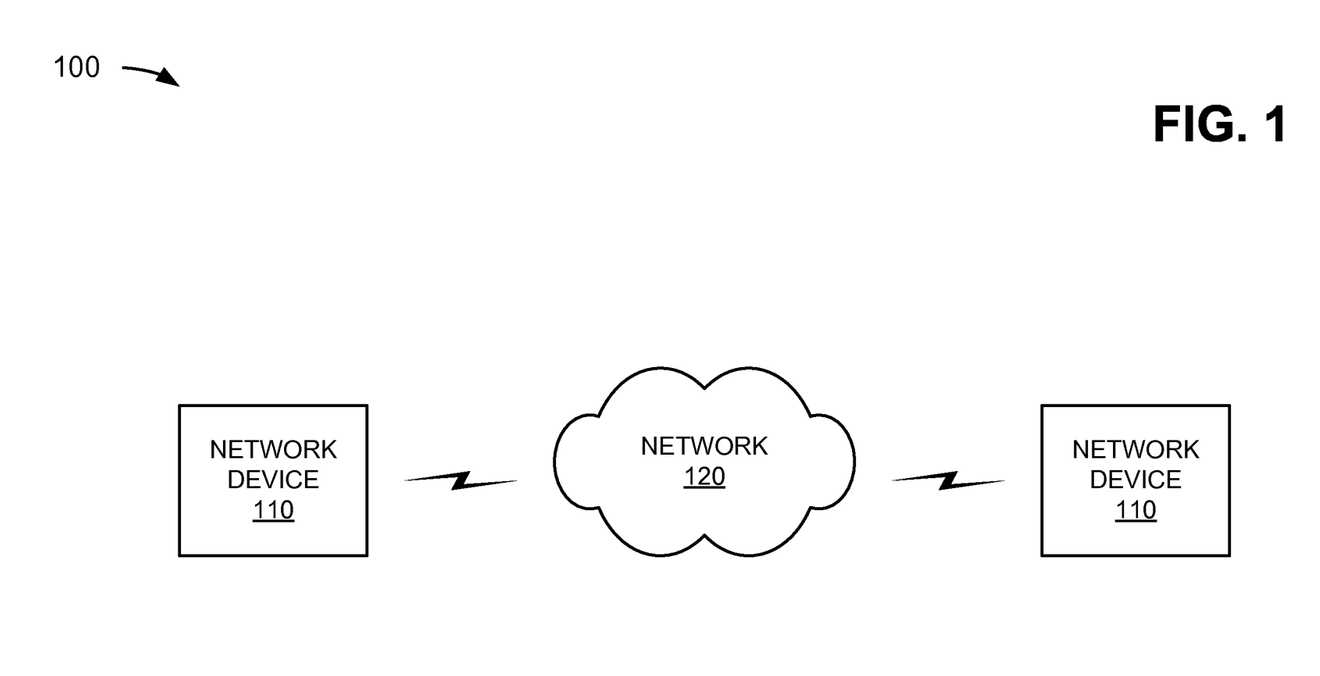
FIG. 1 is a diagram of an exemplary network in which systems and/or methods described herein may be implemented.

FIG. 1 is a diagram of an exemplary network in which systems and/or methods described herein may be implemented. As illustrated, network 100 may include one or more network devices 110 interconnected by a network 120. Components of network 100 may interconnect via wired and/or wireless connections or links. Two network devices 110 and a single network 120 have been illustrated in FIG. 1 for simplicity. In practice, there may be more network devices 110 and/or networks 120. Also, in some instances, one or more of the components of network 100 may perform one or more tasks described as being performed by another one or more of the components of network 100.

Network device 110 may include a data transfer device, such as a gateway, a router, a switch, a firewall, a network interface card (NIC), a hub, a bridge, a proxy server, an optical add-drop multiplexer (OADM), or some other type of device that processes and/or transfers traffic. In an exemplary implementation, network device 110 may include a device that is capable of transmitting information to and/or receiving information from other network devices 110 via network 120.

Network 120 may include one or more networks of any type. For example, network 120 may include a local area network (LAN), a wide area network (WAN), a metropolitan area network (MAN), a telephone network (such as the Public Switched Telephone Network (PSTN), Public Land Mobile Network (PLMN), a wireless network), an intranet, the Internet, an optical fiber (or fiber optic)-based network, or a combination of networks.

Although FIG. 1 shows exemplary components of network 100, in other implementations, network 100 may contain fewer components, different components, differently arranged components, or additional components than depicted in FIG. 1.

Exemplary Network Device Configuration

Figure 2:
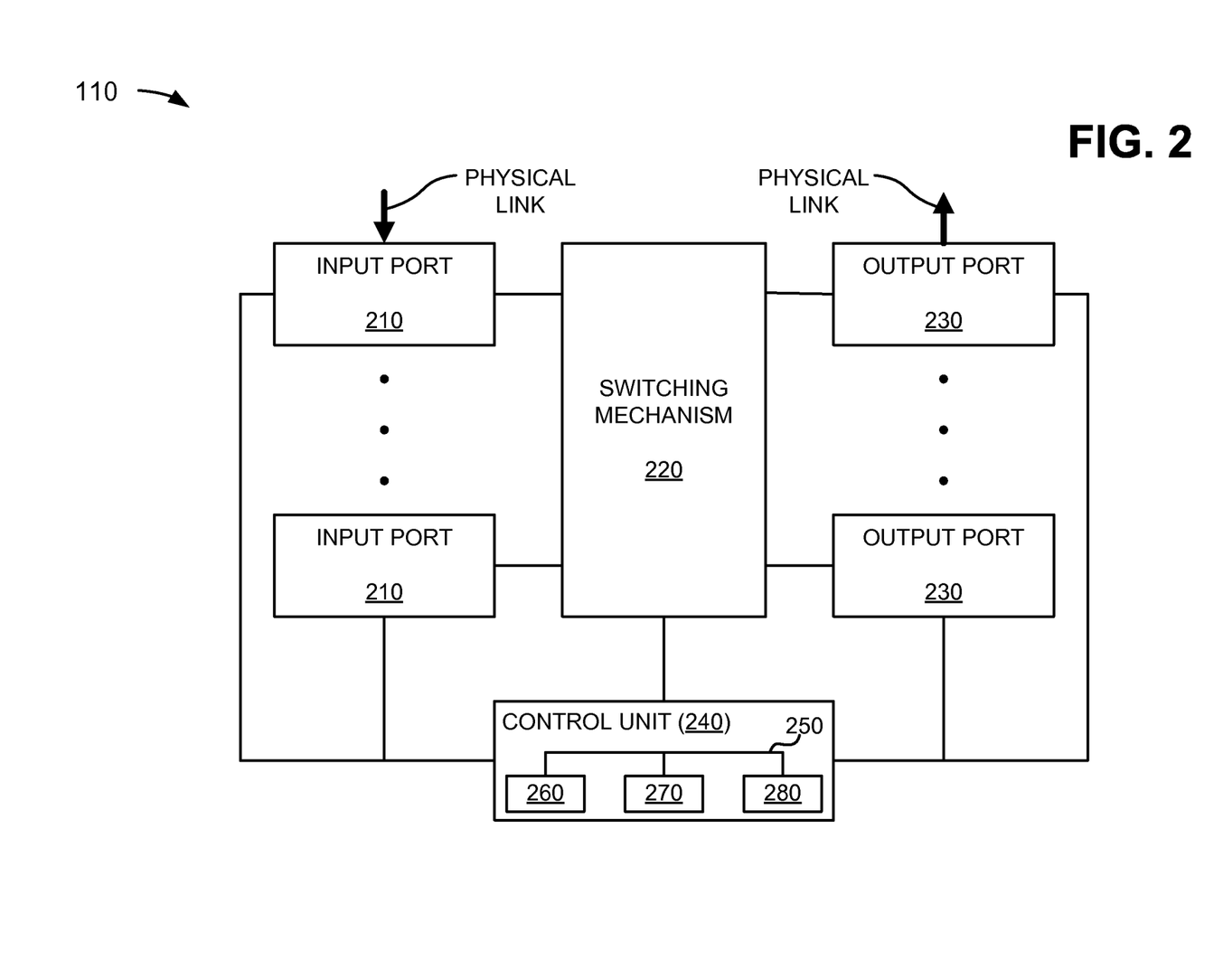
FIG. 2 is a diagram of exemplary components of a network device depicted in FIG. 1.

FIG. 2 illustrates a diagram of exemplary components of network device 110. As shown, network device 110 may include input ports 210, a switching mechanism 220, output ports 230, and a control unit 240.

Input ports 210 may be a point of attachment for a physical link and may be a point of entry for incoming traffic (e.g., packets). Input ports 210 may carry out data link layer encapsulation and decapsulation. Input ports 210 may look up a destination address of an incoming packet in a forwarding table to determine its destination port (i.e., route lookup). In exemplary implementations, input ports 210 may send (e.g., may be an exit point) and/or receive (e.g., may be an entry point) packets.

Switching mechanism 220 may interconnect input ports 210 with output ports 230. Switching mechanism 220 may be implemented using many different techniques. For example, switching mechanism 220 may be implemented via busses, crossbars, and/or shared memories.

Output ports 230 may store packets and may schedule packets for service on an output link (e.g., a physical link) Output ports 230 may include scheduling algorithms that support priorities and guarantees. Output ports 230 may support data link layer encapsulation and decapsulation, and/or a variety of higher-level protocols. In an exemplary implementations, output ports 230 may send packets (e.g., may be an exit point) and/or receive packets (e.g., may be an entry point).

Control unit 240 may use routing protocols and one or more forwarding tables for forwarding packets. Control unit 240 may interconnect with input ports 210, switching mechanism 220, and output ports 230. Control unit 240 may compute a forwarding table, implement routing protocols, and/or run software to configure and manage network device 110. Control unit 240 may handle any packet whose destination address may not be found in the forwarding table.

In an exemplary implementation, control unit 240 may include a bus 250 that may include a path that permits communication among a processor 260, a memory 270, and a communication interface 280. Processor 260 may include one or more processors, microprocessors, ASICs, FPGAs, or other types of processing units that may interpret and execute instructions. Memory 270 may include a RAM, a ROM device, a magnetic and/or optical recording medium and its corresponding drive, and/or another type of static and/or dynamic storage device that may store information and instructions for execution by processor 260. Communication interface 280 may include any transceiver-like mechanism that enables control unit 240 to communicate with other devices and/or systems.

Network device 110 may perform certain operations, as described in detail below. Network device 110 may perform these operations in response to processor 260 executing software instructions contained in a computer-readable medium, such as memory 270. A computer-readable medium may be defined as a physical or logical memory device. A logical memory device may include memory space within a single physical memory device or spread across multiple physical memory devices. The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of network device 110, in other implementations, network device 110 may contain fewer components, different components, differently arranged components, or additional components than depicted in FIG. 2. Alternatively, or additionally, one or more components of network device 110 may perform one or more other tasks described as being performed by one or more other components of network device 110.

Figure 3:
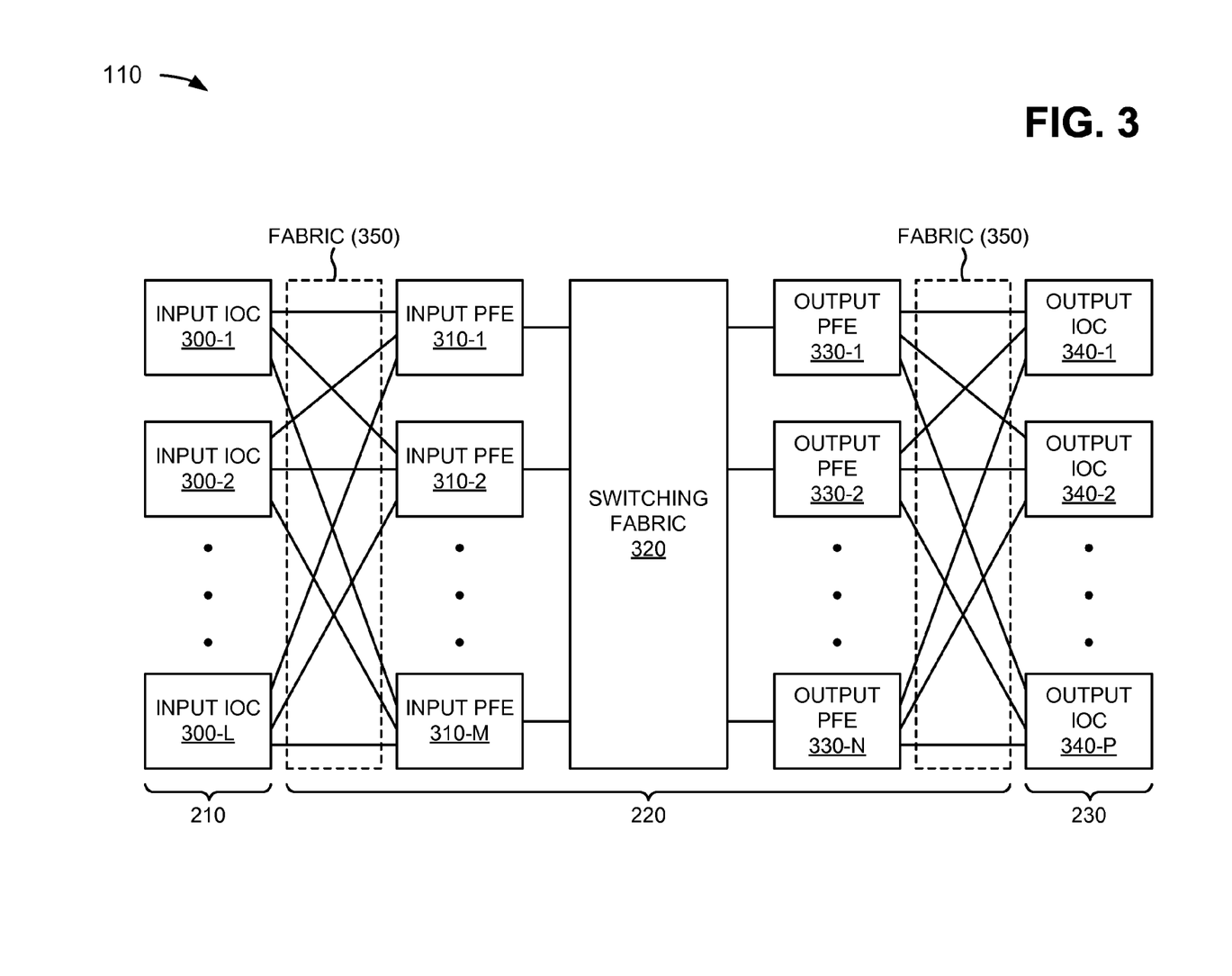
FIG. 3 is a diagram of additional exemplary components of the network device depicted in FIG. 1.

FIG. 3 is a diagram of additional exemplary components of network device 110. As illustrated, network device 110 may include a group of input IOCs 300-1 through 300-L (collectively referred to as "input IOCs 300" and, in some instances, singularly as "input IOC 300"); a group of input (or ingress) PFEs 310-1 through 310-M (collectively referred to as "input PFEs 310" and, in some instances, singularly as "input PFE 310"); a switching fabric 320, a group of output (or egress) PFEs 330-1 through 330-N (collectively referred to as "output PFEs 330" and, in some instances, singularly as "output PFE 330"); a group of output IOCs 340-1 through 340-P (collectively referred to as "output IOCs 340" and, in some instances, singularly as "output IOC 340"); and fabrics 350. As further shown in FIG. 3, input IOCs 300 may correspond to input ports 210 (FIG. 2); input PFEs 310, output PFEs 330, and fabrics 350 may correspond to switching mechanism 220 (FIG. 2); and output IOCs 340 may correspond to output ports 230 (FIG. 2).

Input IOC 300 may include an input/output card that may be a point of attachment for a physical link and may be a point of entry for incoming packets to network device 110. As shown in FIG. 3, each of input IOCs 300 may interconnect with multiple input PFEs 310 (e.g., point-to-multipoint connections), via fabric 350. Input IOC 300 may include a variety of physical interfaces for receiving packets provided to network device 110. For example, input IOC 300 may include one or more Ethernet interfaces with small form-factor pluggable (SFP) connectors, one or more Ethernet interfaces with RJ-45 connectors, one or more Ethernet interfaces with XFP (e.g., 10 Gigabit SFP) connectors, and/or other interfaces.

Input PFE 310 may include a component that may process incoming packets (e.g., received from input IOC 300) prior to transmitting the packets to another PFE (e.g., output PFE 330). Input PFE 310 may also perform route lookup for packets, using forwarding tables, to determine destination information. If the destination information indicates that the packets should be sent to another PFE (e.g., output PFE 330) via switching fabric 320, then input PFE 310 may prepare the packets for transmission to the other PFE, if necessary, and may send the packets to the other PFE, via switching fabric 320.

In an exemplary implementation, input PFE 310 may include a processing unit interconnected with a memory. As described herein, input PFE 310 may perform certain operations in response to the processing unit executing software instructions contained in a computer-readable medium, such as the memory. The software instructions may be read into the memory from another computer-readable medium or from another device. The software instructions contained in the memory may cause the processing unit to perform processes described herein. Alternatively, hardwired circuitry may be used in place of or in combination with software instructions to implement processes described herein. Thus, implementations described herein are not limited to any specific combination of hardware circuitry and software.

Switching fabric 320 may include a switching component that may allow efficient communication between input PFEs 310 and output PFEs 330. For example, switching fabric 320 may include a hardwired non-blocking minimal spanning switch capable of connecting T inputs to T outputs in any combination.

Output PFE 330 may include a component that may process packets (e.g., received from input PFE 310 via switching fabric 320) prior to transmitting the packets to a network (e.g., network 120). Output PFE 330 may also perform route lookup for packets, using forwarding tables, to determine destination information. If the destination information indicates that the packets should be sent out on a physical interface (e.g., one of output IOCs 340) connected to output PFE 330, then output PFE 330 may prepare the packets for transmission by, for example, adding any necessary headers, and may transmit the packets to one of output IOCs 340.

In an exemplary implementation, output PFE 330 may include a processing unit interconnected with a memory. As described herein, output PFE 330 may perform certain operations in response to the processing unit executing software instructions contained in a computer-readable medium, such as the memory. The software instructions may be read into the memory from another computer-readable medium or from another device. The software instructions contained in the memory may cause the processing unit to perform processes described herein. Alternatively, hardwired circuitry may be used in place of or in combination with software instructions to implement processes described herein. Thus, implementations described herein are not limited to any specific combination of hardware circuitry and software.

Fabric 350 may include a switching component that may allow efficient communication between input IOCs 300 and input PFEs 310 and between output PFEs 330 and output IOCs 340. For example, fabric 350 may include a hardwired non-blocking minimal spanning switch capable of connecting S inputs to S outputs in any combination.

Although FIG. 3 shows exemplary components of network device 110, in other implementations, network device 110 may contain fewer components, different components, differently arranged components, or additional components than depicted in FIG. 3. Alternatively, or additionally, one or more components of network device 110 may perform one or more other tasks described as being performed by one or more other components of network device 110.

Exemplary Packet Forwarding Engine (PFE) Interactions

Figure 4:
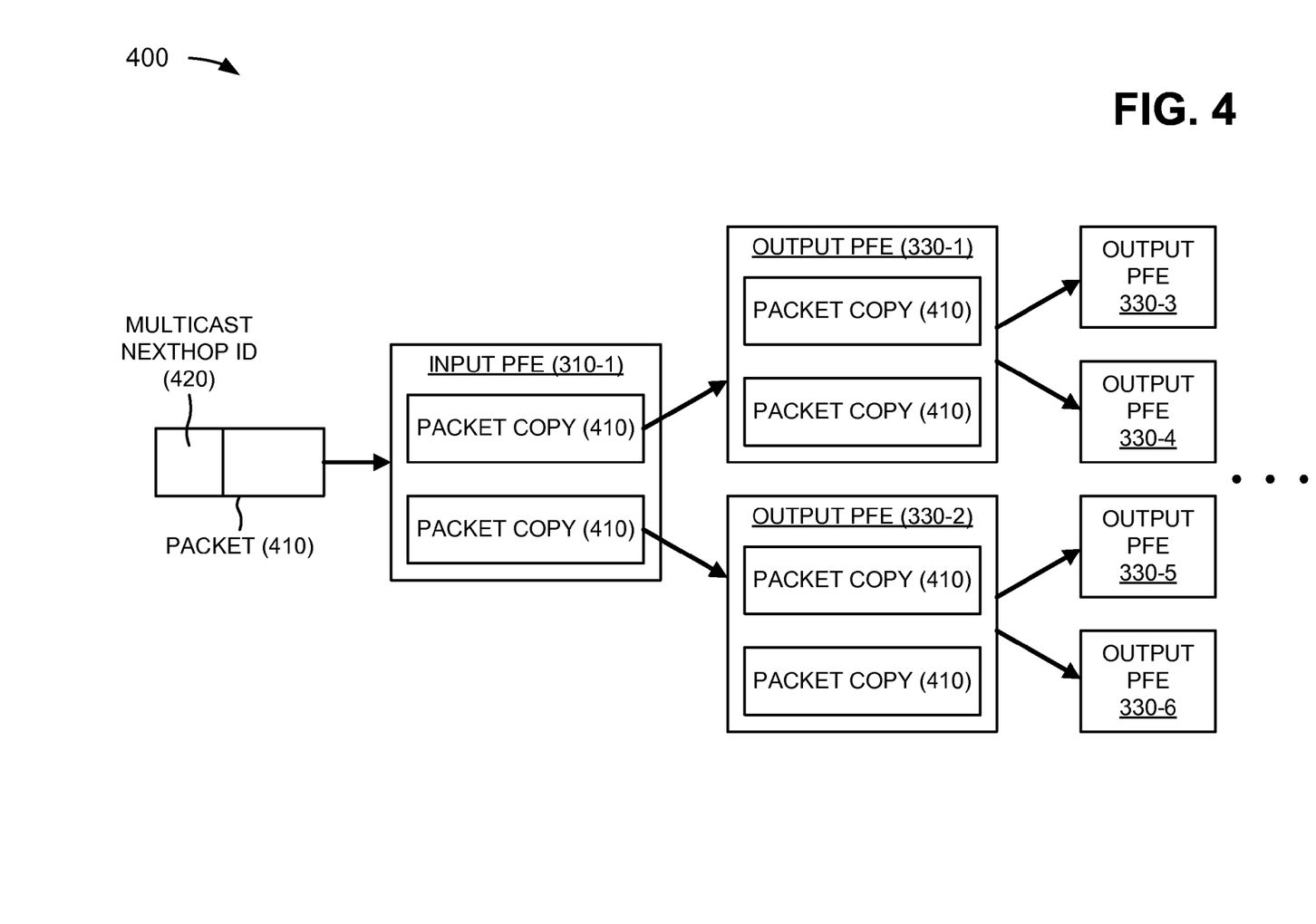
FIG. 4 is a diagram of exemplary interactions among components of an exemplary portion of the network device depicted in FIG. 1.

FIG. 4 is a diagram of exemplary interactions among components of an exemplary portion 400 of network device 110. As shown, portion 400 may include input PFE 310-1 and output PFEs 330-1 through 330-6. Input PFE 310-1 and output PFEs 330-1 through 330-6 may include the features described above in connection with, for example, FIG. 3. In one example, portion 400 may provide a two-way replication tree scheme (e.g., with static tree data structures) and may program nexthops across output PFEs 330-1 through 330-6 accordingly.

As further shown in FIG. 4, input PFE 310-1 may receive a packet 410 (e.g., provided to network device 110). Packet 410 may include a multicast nexthop identifier (ID) 420 (e.g., indicating that packet 410 is a multicast packet) and other information (e.g., header information, payload information, etc.). When packet 410 arrives at input PFE 310-1, the only state available for packet 410 may be multicast nexthop ID 420. Input PFE 310-1 may create two copies of packet 410 (i.e., may create a two-way replication of packet 410), may provide one copy of packet 410 to output PFE 330-1, and may provide another copy of packet 410 to output PFE 330-2.

Output PFE 330-1 may receive the copy of packet 410 from input PFE 310-1, and may create two copies of packet 410. Output PFE 330-1 may provide one copy of packet 410 to output PFE 330-3, and may provide another copy of packet 410 to output PFE 330-4. Output PFEs 330-3 and 330-4 may each receive a copy of packet 410, may replicate packet 410, and may forward the copies of packet 410 to additional output PFEs 330.

Output PFE 330-2 may receive the copy of packet 410 from input PFE 310-1, and may create two copies of packet 410. Output PFE 330-2 may provide one copy of packet 410 to output PFE 330-5, and may provide another copy of packet 410 to output PFE 330-6. Output PFEs 330-5 and 330-6 may each receive a copy of packet 410, may replicate packet 410, and may forward the copies of packet 410 to additional output PFEs 330.

However, when a multicast topology changes in the two-way tree replication scheme (e.g., with static tree data structures) depicted in FIG. 4, all of the PFEs (e.g., input PFEs 310 and output PFEs 330) of network device 110 need to update their local state, which may result in churn. Furthermore, in the two-way tree replication scheme, packets (e.g., packet 410) that were meant to be replicated in an old tree may be forwarded based on a new tree. Implementations described below in connection with, for example, FIGS. 5 and 6, may avoid a need for static tree data structures (e.g., of the two-way replication scheme) that govern packet 410 replication in each PFE (e.g., input PFEs 310 and output PFEs 330).

Although FIG. 4 shows exemplary components of portion 400 of network device 110, in other implementations, network device 110 may contain fewer components, different components, differently arranged components, or additional components than depicted in FIG. 4. Alternatively, or additionally, one or more components of network device 110 may perform one or more other tasks described as being performed by one or more other components of network device 110.

Figure 5:
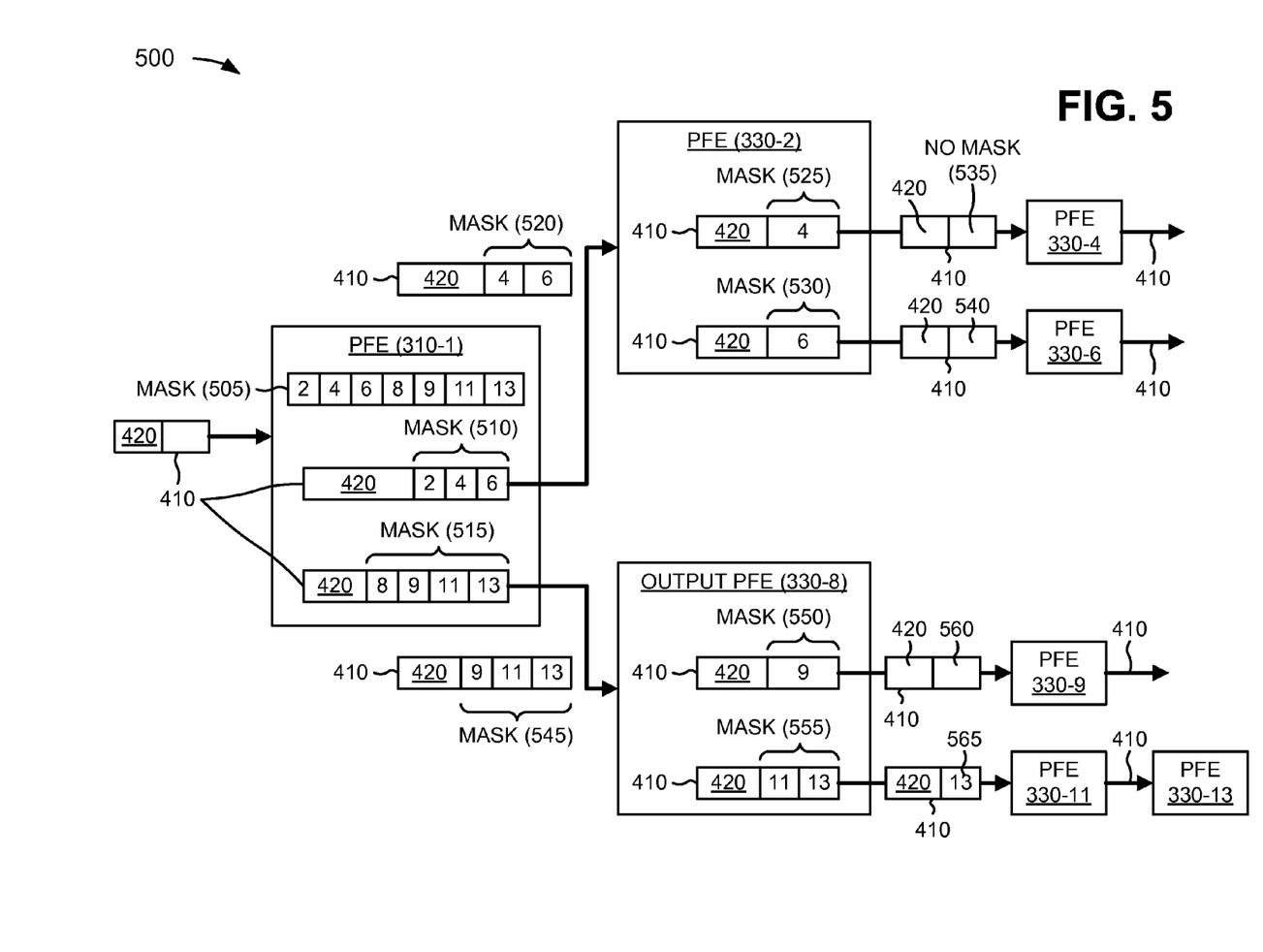
FIG. 5 is a diagram of exemplary interactions among components of another exemplary portion of the network device depicted in FIG. 1.

FIG. 5 is a diagram of exemplary interactions among components of another exemplary portion 500 of network device 110. As shown, portion 500 may include input PFE 310-1 and output PFEs 330-2, 330-4, 330-6, 330-8, 330-9, 330-11, and 330-13. Input PFE 310-1 and output PFEs 330-2, 330-4, 330-6, 330-8, 330-9, 330-11, and 330-13 may include the features described above in connection with, for example, FIG. 3.

As further shown in FIG. 5, input PFE 310-1 may receive packet 410 (e.g., with multicast nexthop ID 420), and may create a mask 505 for packet 410. Mask 505 may include a multi-bit data structure that allocates one or more bits to an index that identifies a PFE (e.g., output PFE 330) yet to be traversed by packet 410. In one example, mask 505 may include multiple indices that identify PFEs (e.g., output PFEs 330) yet to be traversed by packet 410. The number of bits provided in mask 505 may depend on the number of PFEs yet to be traversed by packet 410. As shown in FIG. 5, mask 505 may include indices that identify output PFE 330-2 (e.g., index "2"), output PFE 330-4 (e.g., index "4"), output PFE 330-6 (e.g., index "6"), output PFE 330-8 (e.g., index "8"), output PFE 330-9 (e.g., index "9"), output PFE 330-11 (e.g., index "11"), and output PFE 330-13 (e.g., index "13").

Input PFE 310-1 may divide mask 505 substantially into portions (e.g., halves) to produce a first portion (e.g., half) of mask 505 (e.g., a mask 510) and a second portion (e.g., half) of mask 505 (e.g., a mask 515). Since mask 505 includes an odd number (e.g., seven) of indices, mask 505 may not be divided into equal halves. As shown, mask 510 may include indices "2," "4," and "6," which identify output PFEs 330-2, 330-4, and 330-6. Mask 515 may include indices "8," "9," "11," and "13," which identify output PFEs 330-8, 330-9, 330-11, and 330-13. Input PFE 310-1 may create two copies of packet 410, may provide mask 510 (e.g., and multicast nexthop 420) with a first copy of packet 410, and may provide mask 515 (e.g., and multicast nexthop 420) with a second copy of packet 410.

Input PFE 310-1 may select an index from mask 510 (e.g., a first index "2" that identifies output PFE 330-2), may remove the selected index from mask 510 (e.g., to create mask 520), and may provide the first copy of packet 410 (e.g., with multicast nexthop ID 420 and mask 520) to a PFE (e.g., output PFE 330-2) identified by the selected index. Mask 520 may include indices "4" and "6," which identify output PFEs 330-4 and 330-6.

Output PFE 330-2 may receive the copy of packet 410, and may divide mask 520 substantially into portions (e.g., halves) to produce a first portion (e.g., half) of mask 520 (e.g., a mask 525) and a second portion (e.g., half) of mask 520 (e.g., a mask 530). Mask 525 may include an index "4," which identifies output PFE 330-4, and mask 530 may include index "6," which identifies output PFE 330-6. Output PFE 330-2 may create two copies of packet 410, may provide mask 525 (e.g., and multicast nexthop 420) with a first copy of packet 410, and may provide mask 530 (e.g., and multicast nexthop 420) with a second copy of packet 410. Output PFE 330-2 may select an index from mask 525 (e.g., index "4" that identifies output PFE 330-4), may remove the selected index from mask 525 (e.g., so that no mask 535 remains), and may provide the first copy of packet 410 to a PFE (e.g., output PFE 330-4) identified by the selected index. Output PFE 330-2 may select an index from mask 530 (e.g., index "6" that identifies output PFE 330-6), may remove the selected index from mask 530 (e.g., so that no mask 540 remains), and may provide the second copy of packet 410 to a PFE (e.g., output PFE 330-6) identified by the selected index. Each of output PFEs 330-4 and 330-6 may forward packet 410 to a multicast destination (e.g., to other network devices 110).

Input PFE 310-1 may select an index from mask 515 (e.g., a first index "8" that identifies output PFE 330-8), may remove the selected index from mask 515 (e.g., to create a mask 545), and may provide the second copy of packet 410 (e.g., with multicast nexthop ID 420 and mask 545) to a PFE (e.g., output PFE 330-8) identified by the selected index. Mask 545 may include indices "9," "11," and "13," which identify output PFEs 330-9, 330-11, and 330-13.

Output PFE 330-8 may receive the copy of packet 410, and may divide mask 545 substantially into halves to produce a first half of mask 545 (e.g., a mask 550) and a second half of mask 545 (e.g., a mask 555). Mask 550 may include an index "9," which identifies output PFE 330-9, and mask 555 may include indices "11" and "13," which identify output PFEs 330-11 and 330-13. Output PFE 330-8 may create two copies of packet 410, may provide mask 550 (e.g., and multicast nexthop 420) with a first copy of packet 410, and may provide mask 555 (e.g., and multicast nexthop 420) with a second copy of packet 410. Output PFE 330-8 may select an index from mask 550 (e.g., index "9" that identifies output PFE 330-9), may remove the selected index from mask 550 (e.g., so that no mask 560 remains), and may provide the first copy of packet 410 to a PFE (e.g., output PFE 330-9) identified by the selected index. Output PFE 330-9 may forward packet 410 to a multicast destination (e.g., to another network device 110).

Output PFE 330-8 may select an index from mask 555 (e.g., index "11" that identifies output PFE 330-11), may remove the selected index from mask 555 (e.g., to produce a mask 565 that includes an index "13," which identifies output PFE 330-13), and may provide the second copy of packet 410 (e.g., with mask 565) to a PFE (e.g., output PFE 330-11)

identified by the selected index. Output PFE 330-11 may receive the second copy of packet 410, and may determine that mask 565 contains a single entry (i.e., cannot be divided). Output PFE 330-11 may select the single index from mask 565 (e.g., index "13" that identifies output PFE 330-13), may remove the selected index from mask 565 (e.g., so that no mask remains), and may provide packet 410 to a PFE (e.g., output PFE 330-13) identified by the selected index. Output PFE 330-13 may forward packet 410 to a multicast destination (e.g., to another network device 110).

Although FIG. 5 shows exemplary components of portion 500 of network device 110, in other implementations, network device 110 may contain fewer components, different components, differently arranged components, or additional components than depicted in FIG. 5. Alternatively, or additionally, one or more components of network device 110 may perform one or more other tasks described as being performed by one or more other components of network device 110.

Figure 6:
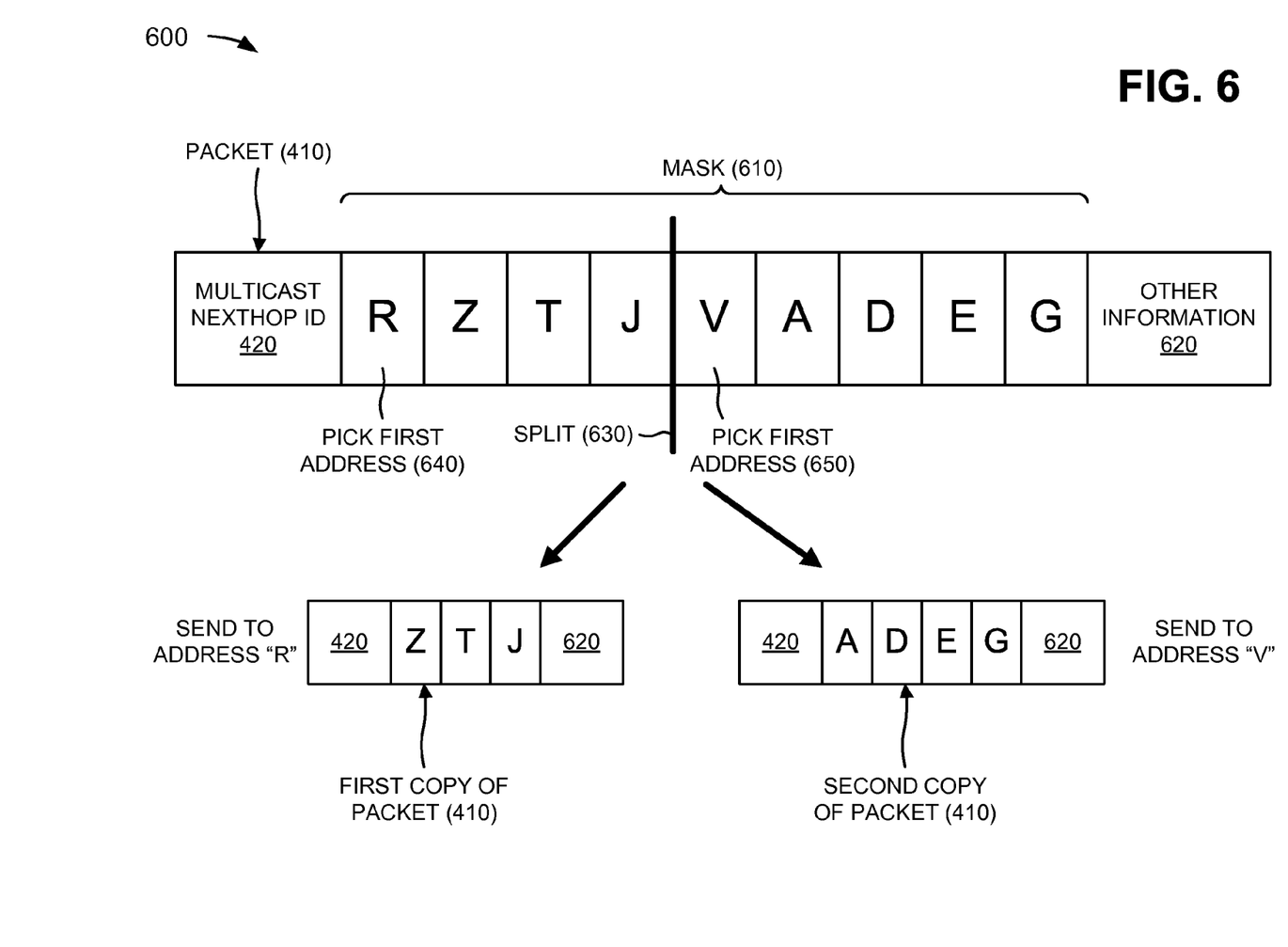
FIG. 6 is a diagram of an exemplary packet structure capable of being generated by the network device depicted in FIG. 1.

FIG. 6 is a diagram of an exemplary packet structure 600 capable of being generated by network device 110. As shown, packet 410 may include multicast nexthop ID 420. Packet 410 and multicast nexthop ID 420 may include the features described above in connection with, for example, FIGS. 4 and/or 5. As further shown, packet 410 may include a mask 610 and other information 620.

Mask 610 may include a multi-bit data structure that allocates one or more bits to an index that identifies a PFE (e.g., output PFE 330) yet to be traversed by packet 410. In one example, mask 610 may include multiple indices that identify PFEs (e.g., output PFEs 330) yet to be traversed by packet 410. The number of bits provided in mask 505 may depend on the number of PFEs yet to be traversed by packet 410. As shown in FIG. 6, mask 610 may include exemplary indices, such as "R," "Z," "T," "J," "V," "A," "D," "E," and "G," that may provide addresses of output PFEs 330 yet to be traversed by packet 410. Other information 620 may include other packet information, such as header information, payload information, etc. associated with packet 410.

As further shown in FIG. 6, a PFE that receives packet 410 may create a first copy of packet 410, and may create a second copy of packet 410. The PFE may determine whether mask 610 may be divided. If mask 610 cannot be divided (e.g., mask 610 includes a single index), the PFE may remove mask 610 from packet 410, and may provide packet 410 to a PFE (e.g., output PFE 330) associated with the single index.

If mask 610 can be divided (e.g., mask 610 includes two or indices), the PFE may substantially split 630 (i.e., divide) mask 610 into halves to produce a first half of mask 610 (e.g., that include indices "R," "Z," "T," and "J") and a second half of mask 610 (e.g., that includes indices "V," "A," "D," "E," and "G"). The PFE may select 640 an index from the first half of mask 610 (e.g., a first index "R" that identifies a first output PFE 330), may remove the selected index from the first half of mask 610, and may provide the modified first half of mask 610 with the first copy of packet 410 (e.g., along with multicast nexthop ID 420 and other information 620). The PFE may select 650 an index from the second half of mask 610 (e.g., a first index "V" that identifies a second output PFE 330), may remove the selected index from the second half of mask 610, and may provide the modified second half of mask 610 with the second copy of packet 410 (e.g., along with multicast nexthop ID 420 and other information 620). The PFE may provide the first copy of packet 410 to the address "R" of the first output PFE 330, and may provide the second copy of packet 410 to the address "V" of the second output PFE 330.

Although FIG. 6 shows exemplary information of packet structure 600, in other implementations, packet structure 600 may contain less information, different information, differently arranged information, or additional information than depicted in FIG. 6.

Exemplary Processes

Figure 7:
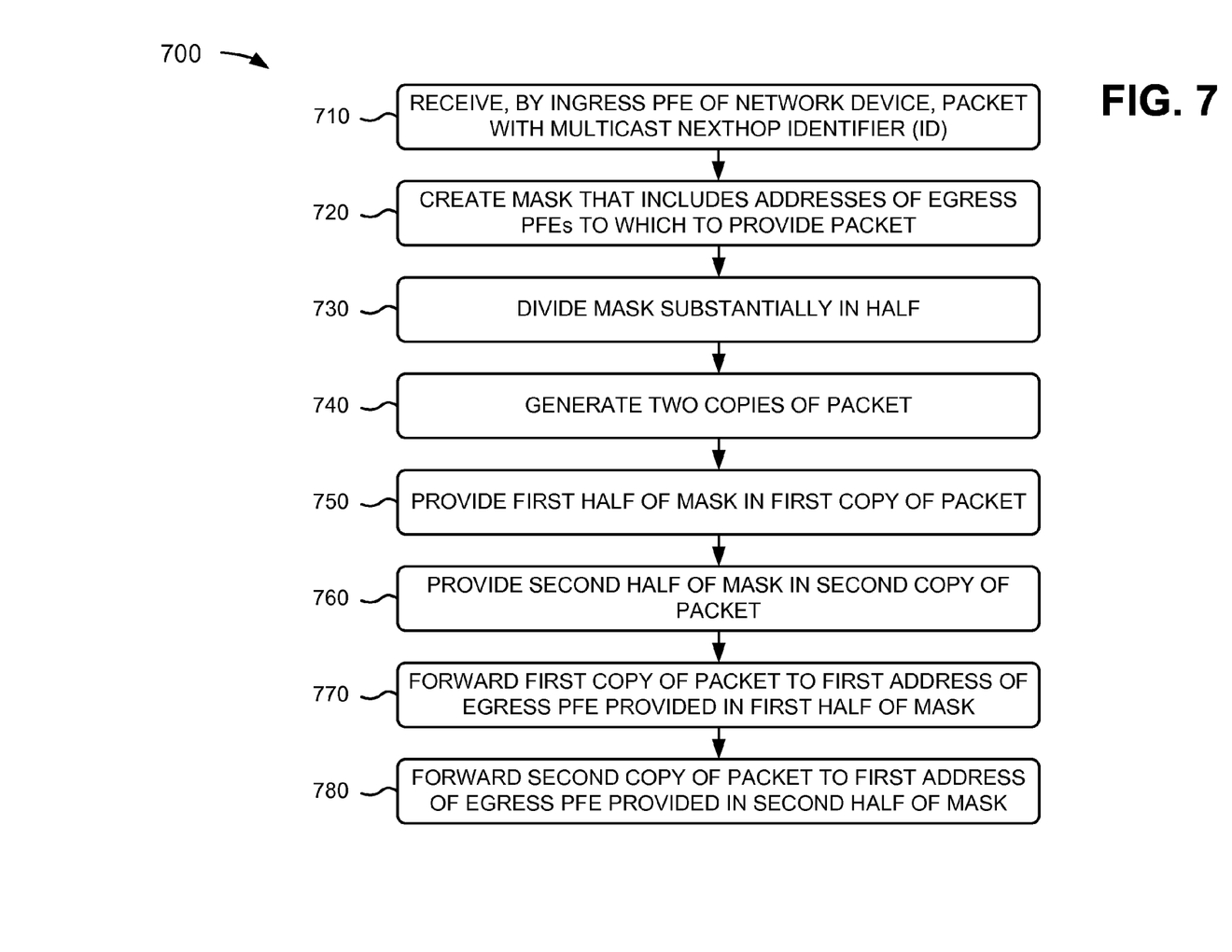
FIGS. 7-9 are flow charts of an exemplary process for providing data structure-less distributed fabric multicast according to implementations described herein.
Figure 8:
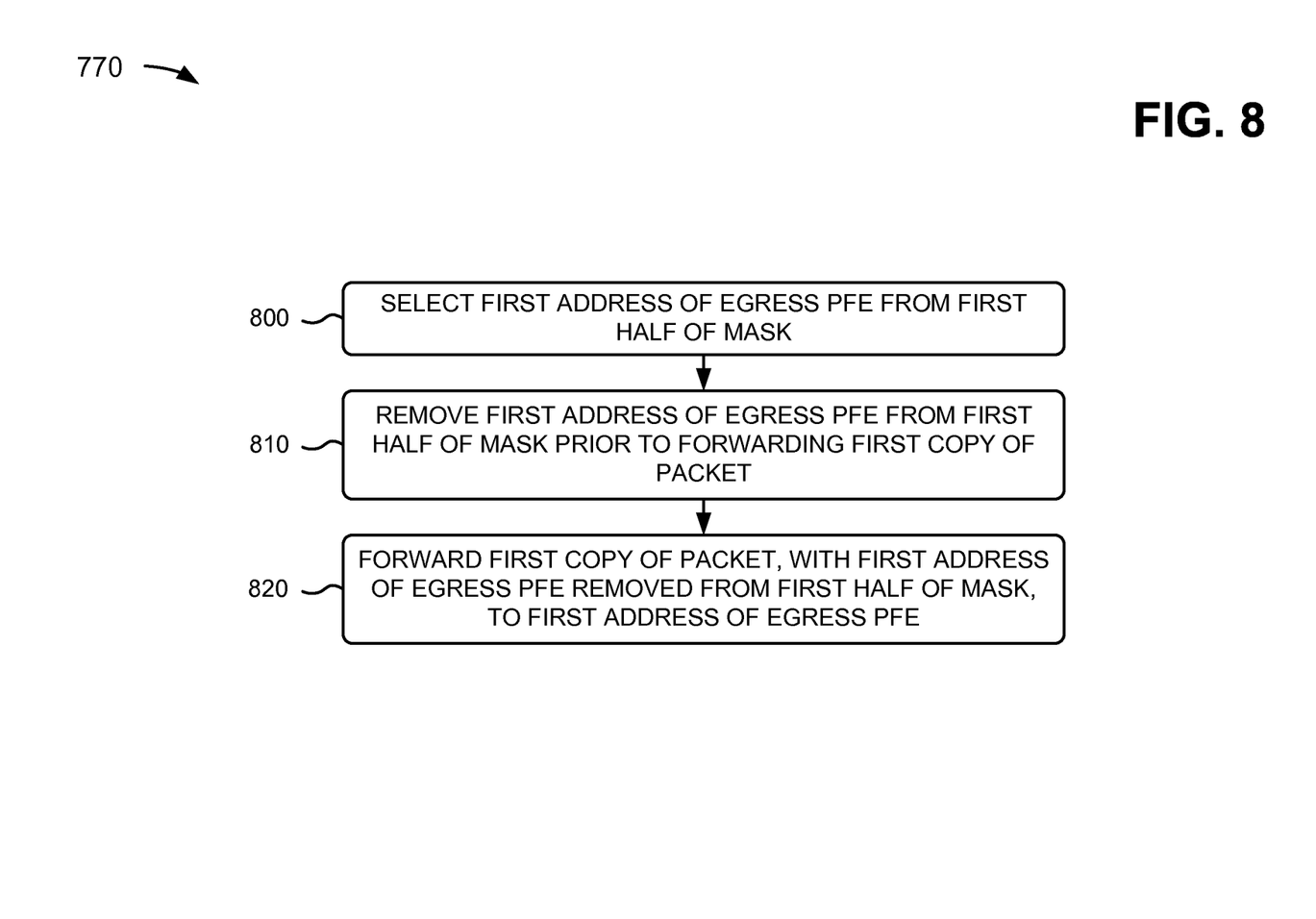
Figure 9:
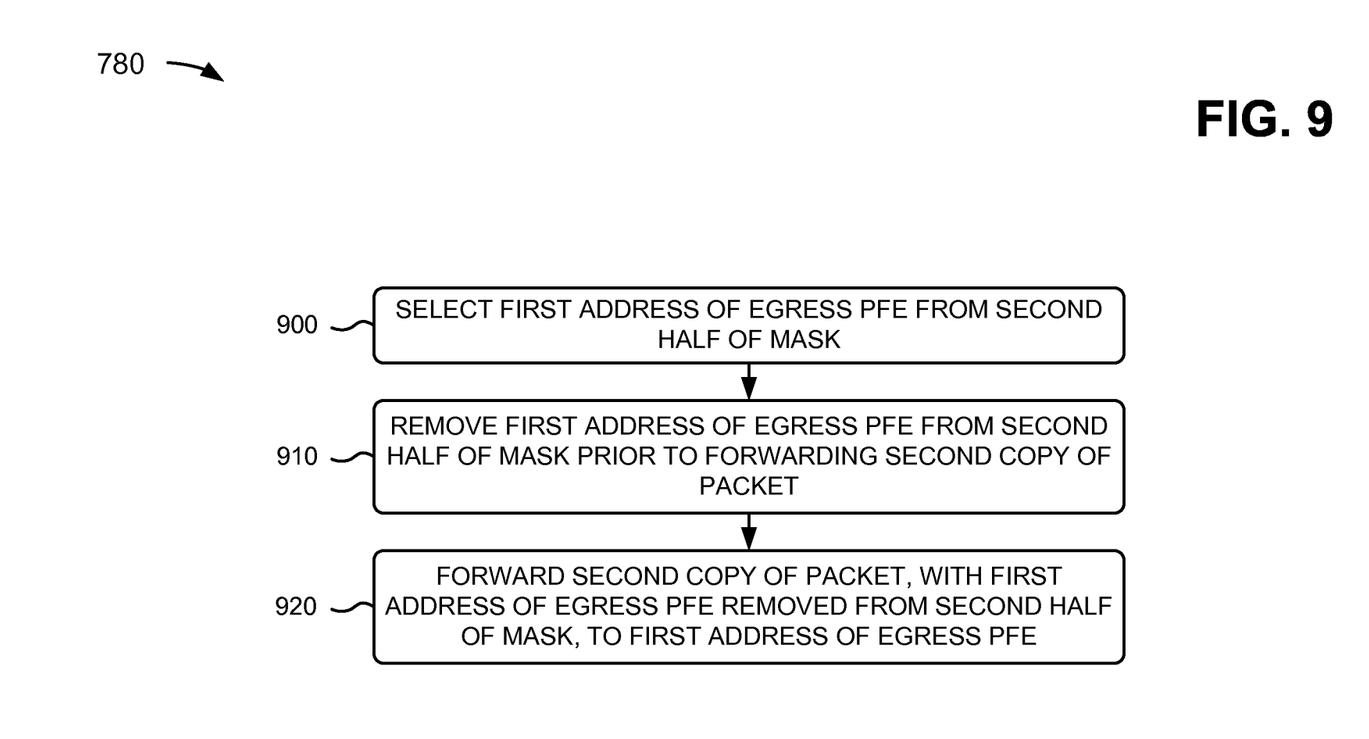

FIGS. 7-9 are flow charts of an exemplary process 700 for providing data structure-less distributed fabric multicast according to implementations described herein. In one implementation, process 700 may be performed by PFE 310/330 (FIG. 3). In another implementation, some or all of process 700 may be performed by network device 110.

As illustrated in FIG. 7, process 700 may include receiving, by an ingress PFE of a network device, a packet with a multicast nexthop identifier (ID) (block 710), and creating a mask that includes addresses of egress PFEs to which to provide the packet (block 720). For example, in implementations described above in connection with FIG. 5, input PFE 310-1 may receive packet 410 (e.g., with multicast nexthop ID 420), and may create mask 505 for packet 410. Mask 505 may include a multi-bit data structure that allocates one or more bits to an index that identifies a PFE (e.g., output PFE 330) yet to be traversed by packet 410. In one example, mask 505 may include multiple indices that identify PFEs (e.g., output PFEs 330) yet to be traversed by packet 410.

As further shown in FIG. 7, process 700 may include dividing the mask substantially in half (block 730), generating two copies of the packet (block 740), providing a first half of the mask in a first copy of the packet (block 750), and providing a second half of the mask in a second copy of the packet (block 760). For example, in implementations described above in connection with FIG. 5, input PFE 310-1 may divide mask 505 substantially into halves to produce a first half of mask 505 (e.g., mask 510) and a second half of mask 505 (e.g., mask 515). Mask 510 may include indices "2," "4," and "6," which identify output PFEs 330-2, 330-4, and 330-6. Mask 515 may include indices "8," "9," "11," and "13," which identify output PFEs 330-8, 330-9, 330-11, and 330-13. Input PFE 310-1 may create two copies of packet 410, may provide mask 510 (e.g., and multicast nexthop 420) with a first copy of packet 410, and may provide mask 515 (e.g., and multicast nexthop 420) with a second copy of packet 410.

Returning to FIG. 7, process 700 may include forwarding the first copy of the packet to a first address of an egress PFE provided in the first half of the mask (block 770), and forwarding the second copy of the packet to a first address of an egress PFE provided in the second half of the mask (block 780). For example, in implementations described above in connection with FIG. 5, input PFE 310-1 may provide the first copy of packet 410 (e.g., with multicast nexthop ID 420 and mask 520) to a PFE (e.g., output PFE 330-2) identified by the selected index. Input PFE 310-1 may provide the second copy of packet 410 (e.g., with multicast nexthop ID 420 and mask 545) to a PFE (e.g., output PFE 330-8) identified by the selected index.

Process block 770 may include the process blocks depicted in FIG. 8. As shown in FIG. 8, process block 770 may include selecting the first address of the egress PFE from the first half of the mask (block 800), removing the first address of the egress PFE from the first half of the mask prior to forwarding the first copy of the packet (block 810), forwarding the first copy of the packet, with the first address of the egress PFE removed from the first half of the mask, to the first address of the egress PFE (block 820). For example, in implementations described above in connection with FIG. 5, input PFE 310-1 may select an index from mask 510 (e.g., a first index "2" that identifies output PFE 330-2), may remove the selected index from mask 510 (e.g., to create mask 520), and may provide the first copy of packet 410 (e.g., with multicast nexthop ID 420 and mask 520) to a PFE (e.g., output PFE 330-2) identified by the selected index.

Process block 780 may include the process blocks depicted in FIG. 9. As shown in FIG. 9, process block 780 may include selecting the first address of the egress PFE from the second half of the mask (block 900), removing the first address of the egress PFE from the second half of the mask prior to forwarding the second copy of the packet (block 910), forwarding the second copy of the packet, with the first address of the egress PFE removed from the second half of the mask, to the first address of the egress PFE (block 920). For example, in implementations described above in connection with FIG. 5, input PFE 310-1 may select an index from mask 515 (e.g., a first index "8" that identifies output PFE 330-8), may remove the selected index from mask 515 (e.g., to create a mask 545), and may provide the second copy of packet 410 (e.g., with multicast nexthop ID 420 and mask 545) to a PFE (e.g., output PFE 330-8) identified by the selected index.

Figure 10:
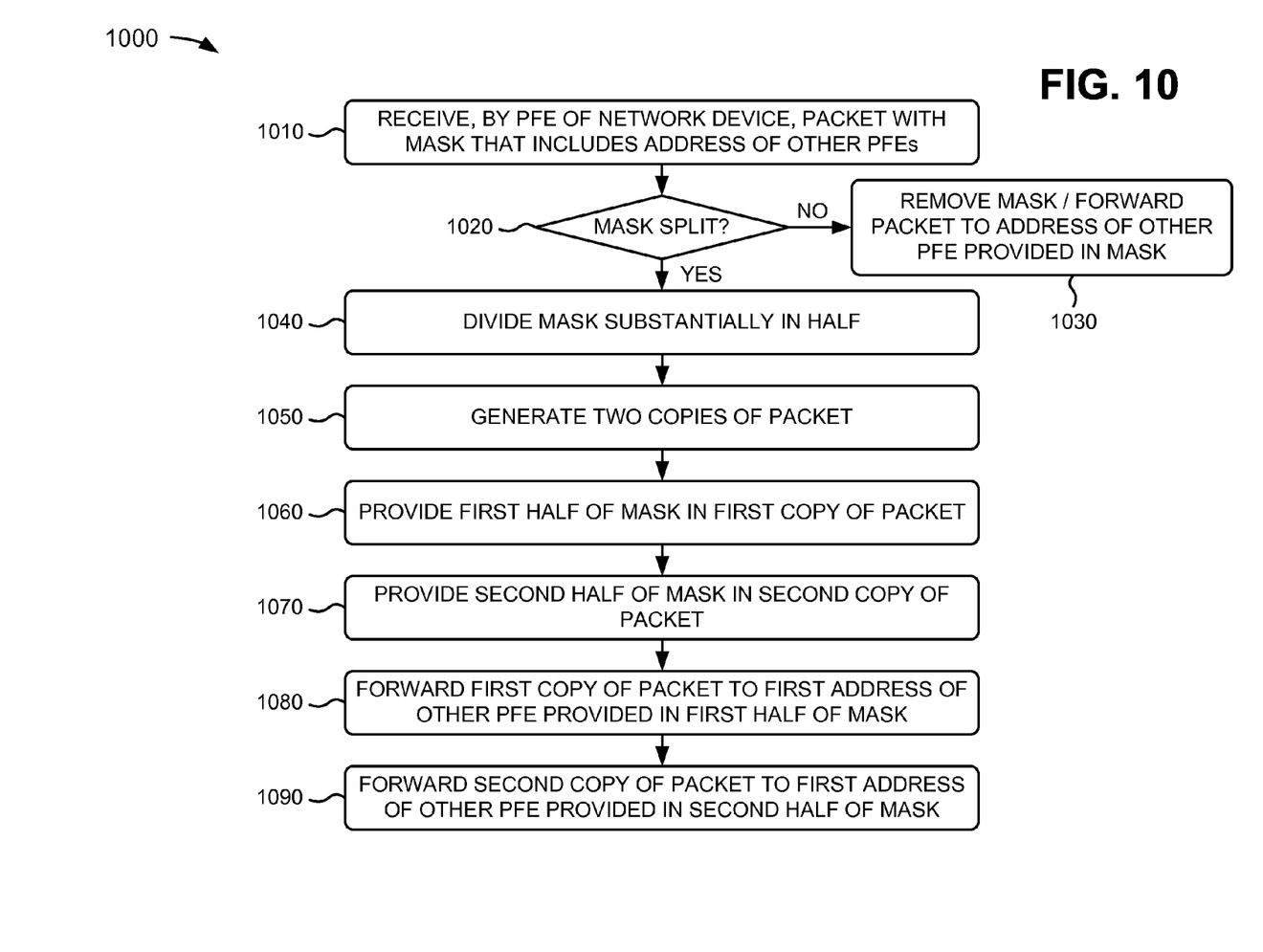
FIG. 10 is a flow chart of another exemplary process for providing data structure-less distributed fabric multicast according to implementations described herein.

FIG. 10 is a flow chart of another exemplary process 1000 for providing data structure-less distributed fabric multicast according to implementations described herein. In one implementation, process 1000 may be performed by PFE 310/330 (FIG. 3). In another implementation, some or all of process 1000 may be performed by network device 110.

As illustrated in FIG. 10, process 1000 may include receiving, by a PFE of a network device, a packet with a mask that includes addresses of other PFEs (block 1010), and determining whether the mask may be split (block 1020). If the mask cannot be split (block 1020—NO), process 1000 may include removing the mask and forwarding the packet to an address of another PFE provided in the mask (block 1030). For example, in implementations described above in connection with FIGS. 5 and 6, input PFE 310-1 may receive packet 410 (e.g., with multicast nexthop ID 420), and may create mask 505 for packet 410. Mask 505 may include a multi-bit data structure that allocates one or more bits to an index that identifies a PFE (e.g., output PFE 330) yet to be traversed by packet 410. In one example, mask 505 may include multiple indices that identify PFEs (e.g., output PFEs 330) yet to be traversed by packet 410. A PFE that receives packet 410 may determine whether mask 610 may be divided. If mask 610 cannot be divided (e.g., mask 610 includes a single index), the PFE may remove mask 610 from packet 410, and may provide packet 410 to a PFE (e.g., output PFE 330) associated with the single index.

As further shown in FIG. 10, if the mask can be split (block 1020—YES), process 1000 may include dividing the mask substantially in half (block 1040), and generating two copies of the packet (block 1050). For example, in implementations described above in connection with FIG. 6, a PFE that receives packet 410 may create a first copy of packet 410, and may create a second copy of packet 410. If mask 610 may be divided (e.g., mask 610 includes two or indices), the PFE may substantially split 630 (i.e., divide) mask 610 into halves to produce a first half of mask 610 (e.g., that include indices "R," "Z," "T," and "J") and a second half of mask 610 (e.g., that includes indices "V," "A," "D," "E," and "G").

Returning to FIG. 10, process 1000 may include providing a first half of the mask in a first copy of the packet (block 1060), providing a second half of the mask in a second copy of the packet (block 1070), forwarding the first copy of the packet to a first address of an another PFE provided in the first half of the mask (block 1080), and forwarding the second copy of the packet to a first address of another PFE provided in the second half of the mask (block 1090). For example, in implementations described above in connection with FIG. 5, input PFE 310-1 may create two copies of packet 410, may provide mask 510 (e.g., and multicast nexthop 420) with a first copy of packet 410, and may provide mask 515 (e.g., and multicast nexthop 420) with a second copy of packet 410. Input PFE 310-1 may provide the first copy of packet 410 (e.g., with multicast nexthop ID 420 and mask 520) to a PFE (e.g., output PFE 330-2) identified by the selected index. Input PFE 310-1 may provide the second copy of packet 410 (e.g., with multicast nexthop ID 420 and mask 545) to a PFE (e.g., output PFE 330-8) identified by the selected index.

CONCLUSION

Implementations described herein may include systems and/or methods that may provide a technique for the binary replication tree scheme that avoids a need for static tree data structures governing packet replication in each PFE. In an exemplary implementation, a mask (e.g., indicating which PFEs have yet to be reached by a multicast packet) and a multicast nexthop ID may be provided with every copy of the packet. When a PFE creates two copies of the packet, the mask may be split substantially into two halves. One half of the mask may be provided with the first copy of the packet, and another half of the mask may be provided with the second copy of the packet. Each copy of the packet (e.g., and its corresponding mask) may be forwarded to another PFE, and the other PFE may perform similar operations. Eventually, the mask may not indicate any more PFEs yet to be reached by the packet, and packet replication may cease (e.g., since the packet may have reached all of the PFEs participating in the multicast). Such an arrangement may reduce complexity and may provide quicker adjustment to changes in a multicast topology.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7 and 8, the order of the blocks may be modified in other implementations. Further, non-dependent blocks may be performed in parallel.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
identifying, by a particular component of a network device, a packet;
determining, by the particular component of the network device, that a mask, associated with the packet, can be divided based on the mask including more than one index;
dividing, by the particular component of the network device, the mask into a first portion of the mask and a second portion of the mask after determining that the mask can be divided;
providing, by the particular component of the network device, a first copy of the packet with the first portion of the mask; and
providing, by the particular component of the network device, a second copy of the packet with the second portion of the mask.

2. The method of claim 1, further comprising:
creating the mask based on addresses of other components that are to be reached based on the packet.

3. The method of claim 1,
where the mask identifies other components, of the network device, that are to be reached based on the packet, and
where the method further comprises:
forwarding the first copy of the packet to an address of a particular component, of the other components, that is identified in the first portion of the mask.

4. The method of claim 1, further comprising:
selecting an index from the first portion of the mask;
removing the index from the first portion of the mask to create a new mask; and
forwarding, to another component associated with the index, the first copy of the packet with the new mask.

5. The method of claim 1, further comprising:
identifying another packet;
determining that another mask, associated with the other packet, cannot be divided; and
providing, after determining that the other mask cannot be divided, the other packet to a different component associated with a single index included in the other mask.

6. The method of claim 5, further comprising:
removing the other mask from the other packet before providing the other packet to the different component.

7. The method of claim 1, further comprising:
generating, based on the packet, the first copy of the packet and the second copy of the packet.

8. The method of claim 1,
where the particular component includes an ingress component of the network device,
where the mask identifies other components, of the network device, that are to be reached based on the packet, and
where the other components include two or more egress components of the network device.

9. A non-transitory computer readable medium storing instructions, the instructions comprising:
one or more instructions that, when executed by at least one processor of a network device, cause the at least one processor to:
identify a packet,
determine that a mask, associated with the packet, can be divided based on the mask including more than one index,
divide, after determining that the mask can be divided, the mask into a first portion of the mask and a second portion of the mask,
provide a first copy of the packet with the first portion of the mask, and provide a second copy of the packet with the second portion of the mask.

10. The non-transitory computer readable medium of claim 9,
where the mask identifies components, of the network device, that are to be reached based on the packet, and
where the instructions further comprise:
one or more instructions that, when executed by the at least one processor, cause the at least one processor to:
create the mask based on addresses of the components.

11. The non-transitory computer readable medium of claim 9,
where the mask identifies components, of the network device, that are to be reached based on the packet, and
where the instructions further comprise:
one or more instructions that, when executed by the at least one processor, cause the at least one processor to:
forward the first copy of the packet to a first address of a first component, of the components, that is identified in the first portion of the mask, and
forward the second copy of the packet to a second address of a second component, of the components, that is identified in the second portion of the mask.

12. The non-transitory computer readable medium of claim 9, the instructions further comprising:
one or more instructions that, when executed by the at least one processor, cause the at least one processor to:
select an index from the first portion of the mask,
remove the index from the first portion of the mask to create a new mask, and forward the first copy of the packet with the new mask.

13. The non-transitory computer readable medium of claim 9, the instructions further comprising:
one or more instructions that, when executed by the at least one processor, cause the at least one processor to:
select an address from the first portion of the mask, and forward the first copy of the packet to the address.

14. A device comprising:
one or more processors to:
determine that a mask, associated with a packet, includes multiple indices;
determine that the mask can be divided based on the mask including the multiple indices,
divide the mask into a first portion of the mask and a second portion of the mask after determining that the mask can be divided,
provide a first copy of the packet with the first portion of the mask, and provide a second copy of the packet with the second portion of the mask.

15. The device of claim 14, where the one or more processors are further to:
determine that another mask, associated with another packet, cannot be divided, and
provide, after determining that the other mask cannot be divided, the other packet to a particular component associated with a single index included in the other mask.

16. The device of claim 15, where the one or more processors are further to:
remove the other mask from the other packet before providing the other packet to the particular component.

17. The device of claim 14,
where the mask identifies two or more components, of the device, that are to be reached based on the packet, and
where the multiple indices that correspond to the two or more components.

18. The device of claim 14, where the one or more processors are further to:
create the mask based on information associated with two or more components that are to be reached based on the packet.

19. The device of claim 14, where the one or more processors are further to:
select an address from the first portion of the mask, and
forward the first copy of the packet to the address.

* * * * *